Patented June 22, 1954

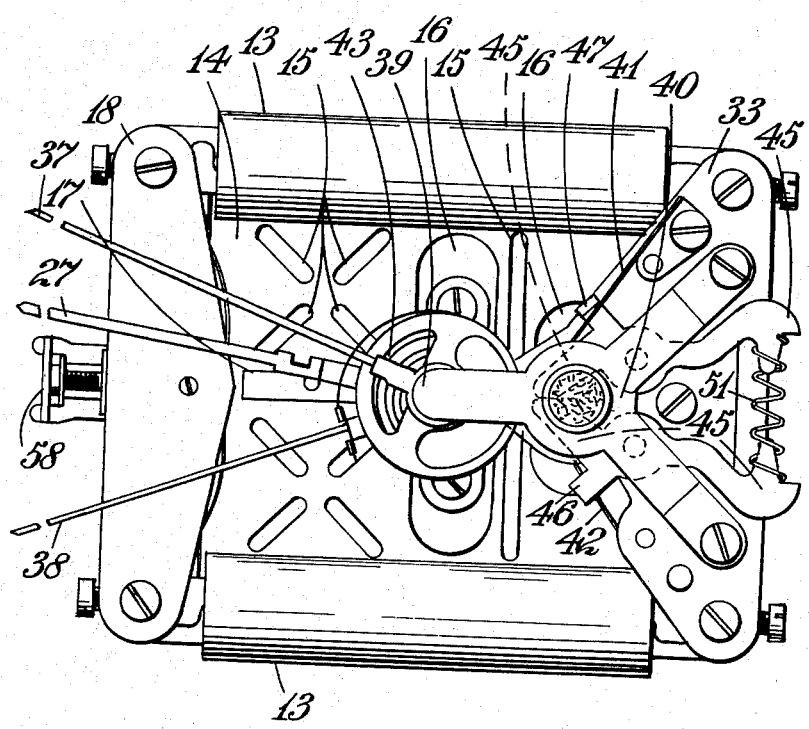

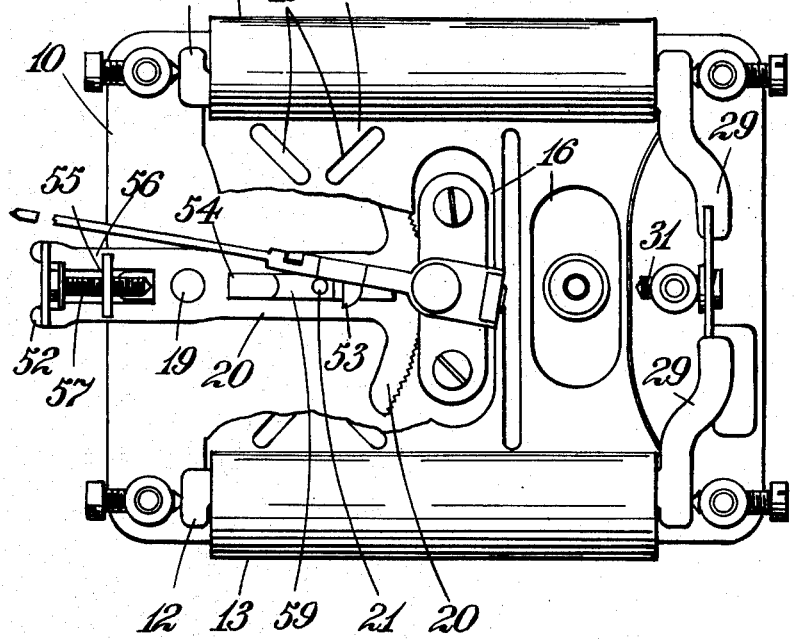
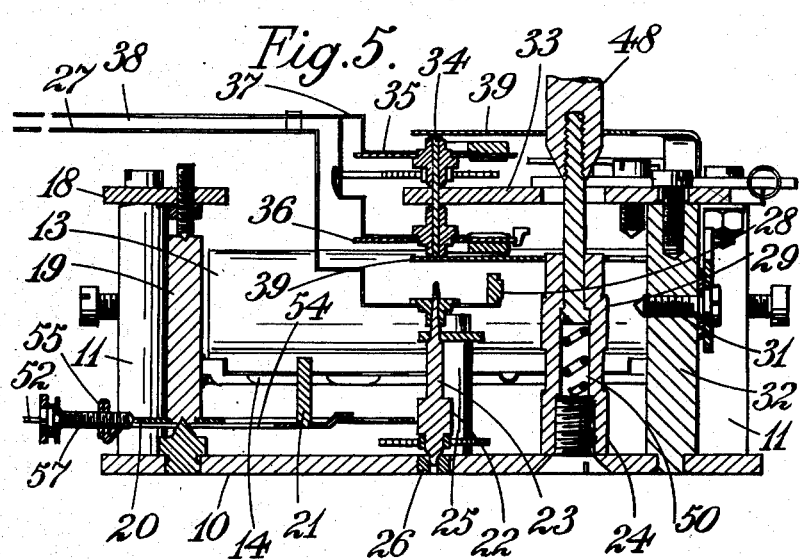

2,681,635

UNITED STATES PATENT OFFICE 2,681,635

INDICATING INSTRUMENT HAVING MAXIMUM AND/OR MINIMUM READING INDICATING MEMBERS

Tom Bowen, Brighton, England, assignor to Pullars Instruments Limited, Brighton, England, a British company Application May 11, 1948, Serial No. 26,414

Claims priority, application Great Britain May 29, 1947

6 Claims. (Cl. 116—129)

This invention relates to indicating instruments of the kind comprising maximum and/or minimum reading indicating members driven by a member which is moved by means responsive to changes in the conditions which are to be measured, which member is hereinafter referred to as the instantaneous member, and may or may not have an instantaneous reading indicating member associated therewith. The invention is particularly concerned with thermometers of the above kind and has for an object to facilitate the resetting of the maximum and/or minimum indicating members.

According to this invention, an indicating instrument of the kind referred to is characterised in that the instantaneous member or a part moving therewith is arranged to one side of one of said indicating members, or between the two indicating members, so as to be engageable thereby, and in that there are provided means for biasing said indicating member or members towards the instantaneous member, and releasable means for retaining said indicating member or members in a limiting position or positions to which it or they have been moved by the instantaneous member. Preferably, said biasing means comprises a spring.

The aforesaid releasable retaining means may comprise pawl-and-ratchet mechanism having means for disengaging the two parts thereof.

In one arrangement according to the invention, the indicating member or members may be arranged to swing about the same axis as the instantaneous member, which latter member is provided with a part which is disposed between and is engageable with the other two members. The maximum and minimum indicating members may each have secured thereto a ratchet wheel having its teeth so arranged as to permit movement past a pawl when the indicating member is moved by the instantaneous member, and a single control member is arranged to engage both said pawls for disengaging them from said ratchet wheels.

The maximum and minimum indicating members may each be connected to opposite ends of a spiral spring so as to tend to move them towards one another.

The above form of construction is particularly applicable to an instrument indicating temperature, in which case the heat-responsive element is arranged to actuate the instantaneous recording member.

The instrument for indicating temperatures may comprise two spirally-wound bi-metallic strips mounted with their axes parallel and having their outer extremities joined with one another and having their inner ends fixed, the joining portion of such strips is connected to an indicating member and which strips are so wound and the bi-metallic layers so arranged that the outer ends of the spirals move in the same direction with a change of temperature. For example, said spirals may be oppositely wound and like metals are arranged on the outside of one of the strips and on the inside of the other, while other like metals of different coefficients of expansion to the first are arranged on the other sides of the strips. In the case where the indicating member is provided with a rotatable indicating member, a pin-and-slot connection may be provided between a part of said indicating member disposed away from its pivot axis and the part joining the two spirals.

Means may also be provided for rotatably adjusting the inner fixed ends of one or both of said spirals whereby the indicating member may be zeroised.

The following is a more detailed description of one form of the invention as applied to a thermometer, reference being made to the accompany drawings, in which—

Figure 3 is a plan of the arrangement shown in Figure 1;

Figure 4 is also a plan view of Figure 1, with certain parts cut away to show the drive for the instantaneous reading indicating member, and Figure 5 is a section on the line 5—5 of Figure 2.

Figure 1:
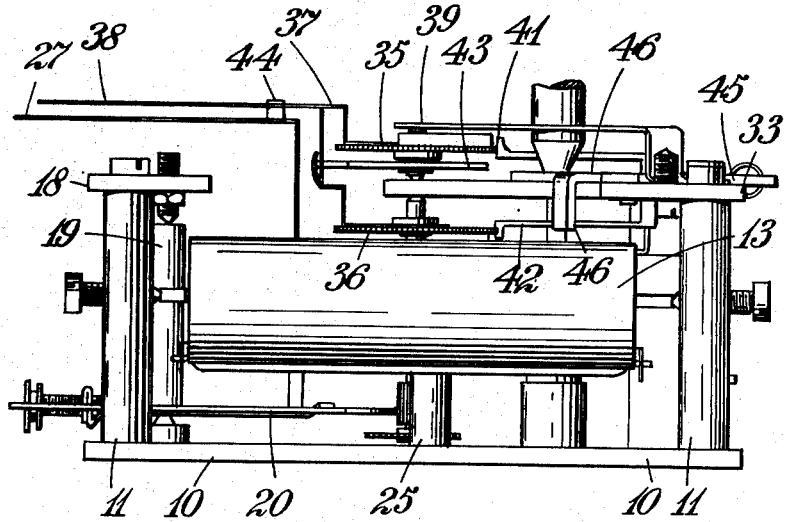
Figure 1 is a side elevation of the apparatus.

Mounted on a base 10 are four main upright pillars 11. Between each pair of main pillars on opposite sides of the base plate is pivotally mounted a shaft 12 (see particularly Figure 4). Anchored to each of these shafts is the inner end of a spirally-wound bi-metallic strip 13. These strips are oppositely-wound and metals of like coefficient of expansion are arranged on the outside of one of the strips and on the inside of the other strip, while other metals of like coefficient of expansion but which differ from the first said metal are arranged on the other side of the strip, so that the outer ends of the spirals move in the same direction upon change of temperature. These outer ends of the strip are connected together by a rigid plate 14 which is provided with various strengthening ribs 15 and with apertures 16 through which various parts of the mechanism can freely extend and with a slot 17 which forms part of the driving connection for said indicating members, as hereinafter more fully described.

Secured across the tops of two of the main pillars 11 at the ends of the spiral strip is a plate 18 between which and the base plate 10 is pivotally mounted a spindle 19 to which is secured a quadrant 20. The quadrant 20 carries a pin 21 which is adjustable in a radial direction and which projects up through the slot 17 in the plate 14 and is engageable with the sides of the slots. Thus rectilineal movement imparted to the connecting plate 14 by the winding and unwinding of the spiral bi-metallic strips imparts rocking movement to the quadrant. The edges of the slot are turned downwardly so as to provide guiding surfaces for the pin. The quadrant engages a pinion 22 having a shaft 23, the upper end of which extends through a bearing formed in a plate 24 secured across the upper ends of two auxiliary pillars 25 fixed to the base plate 10 and projecting up through the slot 17 in the plate 14. The lower end of the spindle 23 is pivotally mounted in a bearing 26 in the base plate. The upper extremity of the spindle 23 has secured to it the instantaneous reading indicating member 27 for cooperation with a dial (not shown) in the usual manner. The indicating member is provided with a suitable counterpoise 28.

Figure 2:
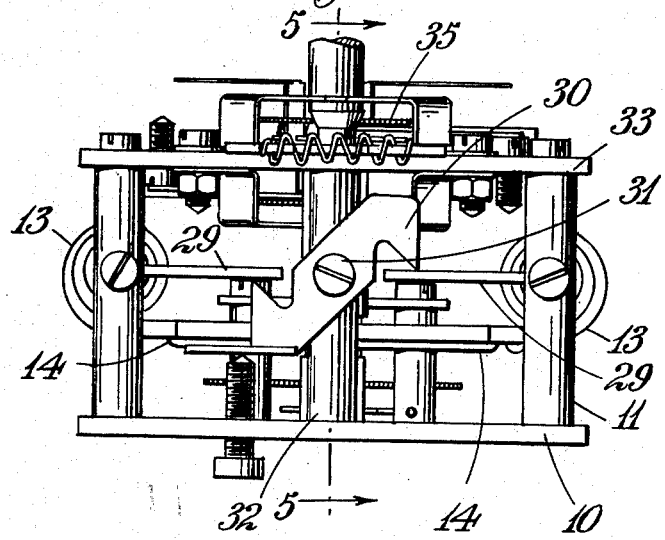
Figure 2 is an end elevation looking from the right of Figure 1.

As will be seen from Figures 2 and 4, the ends of the shaft 12 are provided with crank arms 29, the underside of one of which arms and the upper side of the other are engaged by an adjusting member 30 having hook-shaped extremities and which is pivotally mounted on a clamping screw 31 carried by an intermediate pillar 32. Secured to the upper end of this pillar and across the two main pillars 11 is a triangular plate 33 near the apex of which is fixed an upright spindle 34. Rotatably mounted on this spindle on either side of the plate 33 are two ratchet wheels 35 and 36 to which are fixed the maximum and minimum indicating members 37 and 38 respectively. The ratchet wheels are maintained on the spindle by means of a resilient finger 39 of a member 40 secured to the plate 33, which fingers engage the hub portions of the ratchet wheels. The instantaneous reading indicating member is provided with an upwardly-extending lug 44 which is disposed between the maximum and minimum indicating members 37, 38. The ratchet wheels 35 and 36 are arranged to be engaged by pawls 41 and 42 respectively (as best seen in Figure 1) which pawls are mounted on the plate 33. The teeth of the ratchet wheel 35 are arranged so that the wheel can rotate past the pawl in a clockwise direction, as viewed from the top, while the teeth of the other ratchet wheel 36 are arranged so that it can rotate relatively to its pawl in a counter-clockwise direction. A hairspring 43 has its inner end secured to the hub portion of the ratchet wheel 35 and its outer end connected to the indicating member which is secured to the ratchet wheel 36 and is so wound as to tend to bring the maximum and minimum indicating members together in contact with the opposite sides of the lug 44. The arrangement is such that when the instantaneous reading member 27 moves clockwise the lug 44 thereon engages the maximum indicating member 37 swinging it clockwise and rotating its ratchet wheel 35 past the pawl when the temperature is increasing, and should the temperature then decrease the instantaneous reading indicating member moves counter-clockwise but the maximum reading indicating member is maintained in position by the pawl. The instantaneous reading indicating member may then engage the minimum indicating member, rotating it counter-clockwise together with its ratchet wheel 36 relatively to its pawl 42 until there is again a change of temperature, when the pawl 42 will hold the ratchet wheel in the minimum temperature position. The pawls may be disengaged from their ratchet wheels as follows: Pivotally mounted on the plate 33 are two release plates 45, one of which is provided with a downwardly-directed lug 46 disposed opposite the pawl 42 while the other is provided with an upwardly-directed lug 47 arranged opposite the pawl 41. Disposed between the inner ends of the two arms 45 is the conical end of a plunger 48 (best seen in Figure 5), the lower extremity of which projects into a hollow pillar 49 and abuts against a compression spring 50. By depressing the plunger 48, the conical portions thereof spread the inner ends of the release plates 45 apart, causing the lugs 46 and 47 to engage the pawls and release them so that the maximum and minimum indicating members fly back into contact with the lug 44 on the instantaneous reading indicating member under the action of the hairspring 43. The inner ends of the members 45 are maintained pressed against the plunger by means of a compression spring 51 which engages their ends.

The pin 21 is adjustable radially of the quadrant 20 in the following manner. The pin is mounted on a plate 59 which is mainly located beneath the arm 52 of the quadrant but is provided at one end with a portion 53 which projects up through a slot 54 in the quadrant and is provided with a portion which overlies the sides of the slot.

The other end of the plate 59 is provided with an upstanding lug 55 which extends between a forked portion 56 of the quadrant arm, which lug is provided with a threaded hole engaged by an adjusting screw 57, the end of which engages the quadrant arm at the bottom of the fork. A washer 58 is secured across the ends of the limbs of the fork and the hole in the washer is smaller than the head of the adjusting screw. Thus, whichever way the screw is rotated, movement will be imparted to the pin 21.

In the case where only a maximum reading or minimum reading indicating member is required, one end of the hairspring 43 would be required to be anchored to a fixed part.

The plunger 48 may be operated by a remote control so that the thermometer may be disposed in the open while the indicating members may be reset from the inside of a room from which the thermometer is viewable through the window. The remote control may be similar to that employed for camera shutters and known as an antinous control.

I claim:

1. An indicating instrument comprising an operating member, an instantaneous member driven by said operating member, maximum and minimum indicating members arranged one on either side of said instantaneous member and engageable thereby, means biasing said maximum and minimum indicating members towards the instantaneous member, releasable detents for holding the maximum and minimum indicating members in their limiting positions against the action of the biasing means and means operable simultaneously on both said detents to release them.

2. An indicating instrument comprising an operating member, an instantaneous member driven by said operating member, maximum and minimum indicating members arranged one on either side of said instantaneous member and engageable thereby, spring means biasing said maximum and minimum indicating members towards the instantaneous member, releasable detents for holding the maximum and minimum indicating members in their limiting positions against the action of the spring means and means operable simultaneously on both said detents to release them.

3. An indicating instrument comprising an operating member, an instantaneous member driven by said operating member, maximum and minimum indicating members arranged one on either side of said instantaneous member and engageable thereby, spring means biasing said maximum and minimum indicating members towards the instantaneous member, a ratchet driven by each maximum and minimum indicating member, and a pawl engaging each ratchet and adapted to permit its movement against the action of said spring means, and a single control member operable simultaneously upon said pawls so as to release them.

4. An indicating instrument comprising an operating member, a rotatably mounted instantaneous member driven by said operating member, maximum and minimum indicating members mounted to rotate coaxially with said instantaneous member and arranged one on either side thereof and engageable thereby, spring means urging said indicating members towards the instantaneous member, a ratchet wheel attached to each said rotatable maximum and minimum indicating member, a pawl associated with each ratchet wheel and arranged to permit movement of said indicating members in opposite directions against the action of said spring means, and a single control engageable with both said pawls for simultaneously disengaging said ratchet wheels.

5. An indicating instrument comprising an operating member, a rotatably mounted instantaneous member driven by said operating member, maximum and minimum indicating members mounted to rotate coaxially with said instantaneous member and arranged one on either side thereof and engageable thereby, a spiral spring having opposite ends connected to the maximum and minimum indicating members respectively so as to urge them towards the instantaneous member, a ratchet wheel attached to each said rotatable maximum and minimum indicating member, a pawl associated with each ratchet wheel and arranged to permit movement of said indicating members in opposite directions against the action of said means, and a single control engageable with both said pawls for simultaneously disengaging said ratchet wheels.

6. In a maximum and minimum registering instrument for indicating the changing values of a variable, a dial graduated in units of the variable, a rotatable pointer cooperating with said dial, means responsive to changes in the variable being indicated for moving the pointer to the appropriate graduation on the dial corresponding to the present value of the variable, a pair of discs rotatable in planes parallel to the plane of movement of the pointer, a minimum registering index carried on one disc to cooperate with the graduations on the dial and arranged to be moved by the pointer as it travels through its greatest excursion in one direction, a maximum registering index carried by the other disc to cooperate with the graduations on the dial and arranged to be moved by the pointer as it travels through its greatest excursion in the other direction, means including a hair spring tending to rotate said indexes toward each other, whereby said indexes are biassed toward the respective sides of said pointer, a pawl individual to each disc and normally engaging its disc to retain it in the position to which it has been set by the greatest excursion of the pointer, and means operated at will for releasing said pawls from said discs whereby their respective indexes are brought by said hair spring into engagement with the respective sides of said pointer in whatever position it happens to occupy.

References Cited in the file of this patent

UNITED STATES PATENTS

| Number | Name | Date |
|---|---|---|
| 356,761 | Haight | Feb. 1, 1887 |
| 1,686,035 | Roth | Oct. 2, 1928 |
| 2,110,391 | Davis | Mar. 8, 1938 |
| 2,117,287 | Bloch | May 17, 1938 |
| 2,171,183 | Lamb | Aug. 29, 1939 |
| 2,316,391 | Bloch | Apr. 13, 1943 |
| 2,605,736 | Cook et al. | Aug. 5, 1952 |

FOREIGN PATENTS

| Number | Country | Date |
|---|---|---|
| 4,769 | Great Britain | of 1885 |
| 886,746 | France | May 31, 1941 |